US011344055B2

(12) United States Patent
Schilling et al.

(10) Patent No.: US 11,344,055 B2
(45) Date of Patent: May 31, 2022

(54) COMPOSITIONS OF FOOD GRADE COATINGS TO CONTROL PEST INFESTATIONS AND METHODS OF APPLICATIONS

(71) Applicants: Mississippi State University, Starkville, MS (US); Kansas State University Research Foundation, Manhattan, KS (US)

(72) Inventors: Mark Wes Schilling, Starkville, MS (US); Yan Zhao, Sheboygan, WI (US); Yan Campbell, Starkville, MS (US); Thomas W. Phillips, Manhattan, KS (US); Salehe Abbar, Manhattan, KS (US); Barbara Amoah, Manhattan, KS (US)

(73) Assignees: Mississippi State University, Starkville, MS (US); Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 15/775,829

(22) PCT Filed: Nov. 11, 2016

(86) PCT No.: PCT/US2016/061667
§ 371 (c)(1),
(2) Date: May 12, 2018

(87) PCT Pub. No.: WO2021/708374
PCT Pub. Date: May 18, 2017

(65) Prior Publication Data
US 2018/0325160 A1    Nov. 15, 2018

Related U.S. Application Data

(60) Provisional application No. 62/255,346, filed on Nov. 13, 2015.

(51) Int. Cl.
*A23P 20/10* (2016.01)
*A23B 4/10* (2006.01)
(Continued)

(52) U.S. Cl.
CPC ......... *A23P 20/105* (2016.08); *A01M 17/008* (2013.01); *A23B 4/10* (2013.01);
(Continued)

(58) Field of Classification Search
CPC .......... A23P 20/105; A23P 20/11; A23B 4/20; A23B 5/06; A23B 5/14; A23B 4/10;
(Continued)

(56) References Cited

PUBLICATIONS

CH321493—Machine Translation. (Year: 1957).*
(Continued)

*Primary Examiner* — Hamid R Badr
(74) *Attorney, Agent, or Firm* — Stites & Harbison PLLC; Richard S. Myers, Jr.; Samuel A. Raque

(57) ABSTRACT

The invention consists of novel compositions of food-grade coatings comprising mixtures containing propylene glycol as at least one active ingredient and containing at least one inert food-grade acceptable carrier for controlling food pests and pest infestations and reproduction on and/or in food. The invention further provides novel food containers and methods of applying coating compositions, including those of the invention, to foods and to food containers used to store, age, and/or cure the foods.

24 Claims, 5 Drawing Sheets

(51) Int. Cl.
| | |
|---|---|
| *A23B 4/20* | (2006.01) |
| *A23B 5/06* | (2006.01) |
| *A23B 5/14* | (2006.01) |
| *A23L 3/3481* | (2006.01) |
| *A23L 3/3463* | (2006.01) |
| *A01M 17/00* | (2006.01) |
| *A23C 19/10* | (2006.01) |
| *B65D 30/06* | (2006.01) |
| *B65D 65/42* | (2006.01) |
| *B65D 81/28* | (2006.01) |

(52) U.S. Cl.
CPC .................. *A23B 4/20* (2013.01); *A23B 5/06* (2013.01); *A23B 5/14* (2013.01); *A23C 19/10* (2013.01); *A23L 3/3463* (2013.01); *A23L 3/3481* (2013.01); *A23P 20/10* (2016.08); *B65D 29/04* (2013.01); *B65D 65/42* (2013.01); *B65D 81/28* (2013.01); *A23V 2002/00* (2013.01); *A23V 2200/10* (2013.01); *A23V 2250/5026* (2013.01); *A23V 2250/5036* (2013.01); *A23V 2250/5086* (2013.01)

(58) Field of Classification Search
CPC ........ A23C 19/10; B65D 29/04; B65D 65/42; B65D 81/28
USPC .......................................................... 426/92
See application file for complete search history.

(56) References Cited

PUBLICATIONS

Zhao, Y. et al. 2012. Annual Int. Research Conf. on Methyl Bromide Alternatives and Emission Reduction. (Year: 2012).*
Banker, G. S. et al., J. Pharm. Pharmac. 18: 457-466 (Year: 1966).*
Bozdemir, O. A. et al. Turk J. Chem. 27: 773-782 (Year: 2003).*

* cited by examiner (a)            (b)

(a)                                (b)

COMPOSITIONS OF FOOD GRADE COATINGS TO CONTROL PEST INFESTATIONS AND METHODS OF APPLICATIONS

CROSS-REFERENCE TO RELATED APPLICATION

This application claims priority from U.S. Provisional Patent Application Ser. No. 62/255,346 filed Nov. 13, 2015. The entirety of the provisional application is incorporated herein by reference.

STATEMENT OF GOVERNMENT SUPPORT

This invention was made with government support under grants 2013-51102-21016 and 1003784 awarded by the National Institute of Food and Agriculture, U.S. Department of Agriculture. The government has certain rights in the invention.

FIELD OF THE INVENTION

This invention relates to the field of food science and, more specifically, to novel compositions of economically-efficient and environmentally-friendly food-grade coatings to control pests and pest reproduction and to protect foods from pest infestations. The invention also discloses composition-treated containers and methods for infusing coatings, including those of the invention, into food containers, wraps, and nets used to store and/or cure the foods.

BACKGROUND OF THE INVENTION

The mold or cheese mite, *Tyrophagus putrescentiae* (Schrank), is a cosmopolitan pest that infests high-moisture grains and stored food products that have high fat and protein contents (Gulati and Mathur, 1995), including dry-cured ham. Dry-cured hams, for example, may become infested with ham mites during the aging process. A female can lay an average of 437 eggs under favorable temperatures and 90-100% relative humidity (RH) (Rodriguez and Rodriguez, 1987). At 60%-80% RH and 20-30° C., the mold mite can complete one generation in 8 to 21 days. Dry-cured ham is very susceptible to mite infestations after 4-6 months of aging due to its high fat and protein content, moldy surface, and volatile flavor composition. Mold mites have been reported as a problem for dry-cured ham both in Spain (Sánchez-Ramos and Castañera, 2000) and the United States (Rentfrow et al., 2008). Methyl bromide is the only known available fumigant pesticide that is effective at controlling ham mite infestations in dry-cured ham plants. A survey of 34 dry cured ham plants in the United States revealed that 22 of the plants surveyed used methyl bromide fumigation between one to five times a year, a number that was determined based on the number of times that hams were infested with mites during the year (Rentfrow et al., 2008). This demonstrates that methyl bromide fumigation is important to the economic viability of the dry cured ham industry, which justifies the need for alternative methods to methyl bromide fumigation to prevent and control mite infestations. Moreover, methyl bromide is to be phased out of industrial use due to its ozone-depleting characteristics, thereby prompting the development of the food-grade coatings and film compositions of the present invention to control mite infestation without adversely affecting the food aging process, the permeability to moisture characteristics, or the sensory properties of the foods.

Edible coatings have been applied for different purposes on a variety of food products including fresh fruits and vegetables, confections, and meat products. For meat products, edible films and protective coatings have been used to prevent off-flavor due to oxidation, discoloration, quality loss such as shrinkage, and microbial contamination (Ustunol, 2009). Edible coatings may be used to control ham mite infestations if they do not negatively affect flavor and the aging process and are effective at controlling mites. Previous studies on dipping ham slices/cubes directly into mineral oil, propylene glycol, 10% potassium sorbate, glycerin, and hot lard indicated that both lard and propylene glycol were effective ($P<0.05$) at controlling mite reproduction under laboratory conditions. In addition, no differences were detected in sensory characteristics between hams treated with food grade ingredients and non-treated control hams (Zhao et al., 2012). Follow-up studies were carried out to study the effect of propylene glycol-based coatings on mite mortality.

Polysaccharides were used to form uniform and consistent film coatings on the surface of ham cubes to reduce the cost of the food grade or film coating and to minimize the amount of propylene glycol. Xanthan gum, agar, propylene glycol alginate, and carrageenan+propylene glycol alginate were tested by using proprietary formulations with water and 50% (w/w) of propylene glycol (PG). Coatings were applied by dipping the cubes into the gel solutions. Twenty large (mostly adult female) mites were placed on each cube of ham and the cube was placed in a mite-proof, ventilated glass container and incubated for two (2) weeks. All treatments with 50% PG (by weight or by volume) were effective at controlling mite reproduction. To further investigate the minimum propylene glycol concentration needed to control mite infestations, 10%-50% (w/w) propylene glycol was tested further with xanthan gum and carrageenan+propylene glycol alginate due to their film-forming abilities at various concentrations of propylene glycol. Results demonstrated that xanthan gum+20% propylene glycol and carrageenan/propylene glycol alginate+10% propylene glycol was the lowest concentration of propylene glycol that was effective at controlling mite reproduction on ham cubes.

American dry cured ham products typically need to lose at least 18% of their original weight during the production process. Therefore, the water vapor permeability (WVP) of the film coatings must be considered when choosing a proper coating for dry-cured ham. The WVP of films formed with carrageenan/propylene glycol alginate+0-50% propylene glycol and xanthan gum+10-50% propylene glycol were carried out by ASTM method E96-95(1995) with some modifications (Ghanbarzadeh et al., 2011). For films made from xanthan gum, the WVP range was from about $1.17 \times 10^{-7}$ gPa$^{-1}$ h$^{-1}$ m$^{-1}$ to about $1.84 \times 10^{-7}$ gPa$^{-1}$ h$^{-1}$ m$^{-1}$ as the amount of propylene glycol increased from about 10% to 50% in the gel solution. For films made from carrageenan/propylene glycol alginate, the WVP range was from about $2.08 \times 10^{-7}$ gPa$^{-1}$ h$^{-1}$ m$^{-1}$ to about $3.6 \times 10^{-7}$ gPa$^{-1}$ h$^{-1}$ m$^{-1}$ as the amount of propylene glycol increased from about 0% to 50% in the gel solution. For a 0.045 mm thick film made from carrageenan/propylene glycol alginate+50% propylene glycol, for example, about 24 g of water vapor is typically able to penetrate through a one square meter area at room temperature per hour. Weight loss of whole hams coated with 100% propylene glycol, 50% propylene glycol, 2% carrageenan+50% propylene glycol, hot lard dip, and diatomaceous earth were studied after hams were treated for 48 days. Compared with control hams which lost 7.4% of its total weight, hams coated with about 2% carrageenan+50% propylene glycol lost 6.4% of their total weight. In addition, both ham treatments lost greater than about 18% of moisture during the entire aging process.

Results indicate that xanthan gum and carrageenan+propylene glycol alginate can be effective at preventing mite infestations. The present invention provides novel compositions to control such pests and pest infestations from and/or on foods and methods of applying such compositions to foods and to and/or within food containers for controlling pests.

The present invention provides a resolution to the need for an efficient and cost-effective, as well as an environmentally-friendly, food-grade coating and compositions to control pests and pest infestations from and/or on foods, as well as methods for applying compositions to and/or within food containers used to store and/or cure the foods. The present invention provides such compositions, containers, and methods.

SUMMARY OF THE INVENTION

The present invention provides novel compositions of food-grade coatings that can control pest infestations and reproduction, such as ham mites, and methods of infusing coatings, including the coatings of the invention, into food containers such as wraps and nets. The food-grade coating compositions contain propylene glycol as the active ingredient. The invention is designed to be used on or with ham, pork, and any food upon which mites typically thrive, as well as on or with cheese and fermented soy food products, for example. The invention further provides composition-treated food containers and methods to infuse compositions into food containers and nets used to store, age, and/or cure such foods.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention as follows.

DETAILED DESCRIPTION OF THE INVENTION

Figure 1:
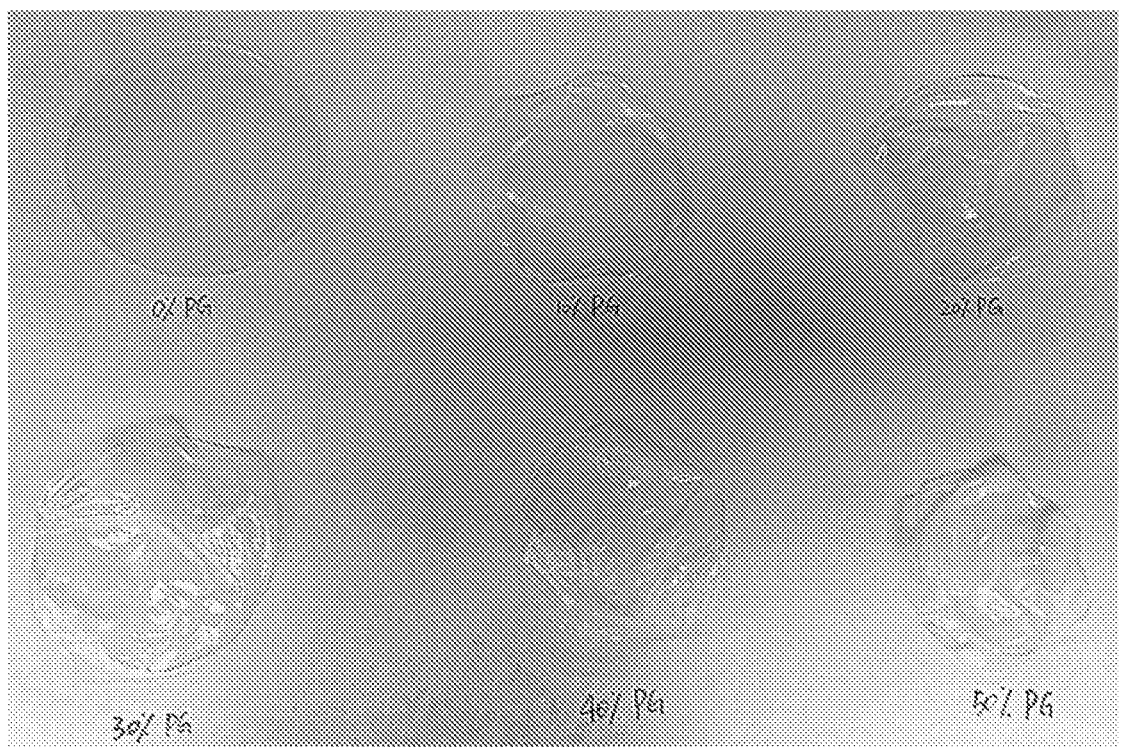
FIG. 1 depicts films of certain food-grade coating compositions of the present invention utilizing carrageenan, propylene glycol alginate, and propylene glycol as various percentages of the composition.

The present invention provides novel formulations of food-grade coating compositions that control ham mites (*Tyrophagus putrescentiae*) and similar pests and provides composition-treated food containers and methods of infusing coating compositions onto and/or into food containers such as food bags, food wraps, and food or ham nets, for example. The food-grade composition ingredients contain propylene glycol, a clear, colorless, and hygroscopic liquid as at least one active ingredient and at least one suitable inert food-grade acceptable carrier for the at least one active ingredient. The mixtures of the composition preferably also contain gum, such as xanthan gum, propylene glycol alginate, carrageenan, water, or a combination thereof. Other active ingredients, such as lard, may be used individually or in combinations with other active ingredients. In a preferred embodiment, the at least one carrier is gum and preferably xanthan gum, water, or a combination thereof, which act or acts as the carrier for the active ingredient(s), preferably for the propylene glycol. Other gum carriers are also very effective, such as propylene glycol alginate and carrageenan, as carriers for the active ingredients(s) of the invention. These and other gums can be added to a sufficient amount of water, either individually or in combination, to effectively act as a carrier(s) for the active ingredient(s). Also preferably, the propylene glycol alginate is combined with the carrageenan. The composition of the invention may also contain at least one polysaccharide. The composition mixtures are formed via controlled temperature parameters with standard temperature control and monitoring processes and equipment. The combination of the materials of the mixtures is in fact active since propylene glycol will evaporate over time. The coating compositions of the invention will slow mite growth and infestation without propylene glycol, but the combinations of the propylene glycol and carrier lengthen the effectiveness of the propylene glycol. Although the compositions of the invention are food-grade acceptable and edible, they are processing aids and are removed before cooking and consumption.

The invention includes the use of such compositions via coatings and/or films formulated with food-grade ingredients and placed on the surface of the food and/or in the food to be protected, such as dry-cured ham for example, to prevent and/or control pest infestation and pest reproduction, such as from the ham mite. The coating compositions applications to the food involve controlled temperature(s) of the compositions via standard temperature control and monitoring methodologies and equipment. The coatings and/or films can be in various structural forms, such as gel, freeze-dried powder, film, and material that resembles plastic wrap, for example, or any suitable combination. The compositions, and the mixtures that make up the compositions, may be applied or administered to, on, and/or in the foods in an effective amount so they sufficiently coat the foods and cracks and crevices therein in any of multiple ways, such as by spraying, misting, dipping, coating by machine or manually, and the like, or any suitable combination thereof. The invention provides methods of protecting food from pest infestation and reproduction by applying an effective amount of compositions of the invention on and in the food and/or coating the food with an effective amount of compositions of the invention and simultaneously controlling the temperature of the compositions as they are applied. The methods of the invention in protecting food therefore preferably utilize the coating compositions of the invention. The invention includes composition-treated food containers and methods to infuse or combine coatings and/or films, including those of the invention, onto and/or with the food containers such as ham nets, fine mesh materials, bags, nets, or wrappings. Infusion as used herein is defined as incorporating the coatings, films, or compositions into, with, and/or around the food containers, mesh, bags, nets, or wrappings through processing, most often or typically through spraying, rolling, or pressing, for example, where the temperature of the compositions and the speed, pressure, relative humidity, or a combination thereof, of the infusion process are controlled and monitored, thereby forming treated food container(s). The temperature of the compositions is controlled and monitored (via standard real-time temperature control and monitoring means and methods) and the speed, pressure, relative humidity, or a combination, of the infusion and integration of the compositions into the container(s) is controlled and monitored via various standard means and methods for real-time controlling and monitoring of the infusion parameter adjustments and obtaining such data and measurements. The treated food container(s) can be used with food that has been treated with the compositions of the invention and/or with food that has not been treated. Finally, the method of food protection includes sufficiently wrapping or covering the food with the treated food container(s) of the invention. Test results showed that use of small mesh-sized nets (as food containers), for example, infused with the coating compositions of the invention was successful in limiting mite movement and reproduction. As a result, food producers, including dry-cured ham producers for example, may be better able to utilize the containers to control pests and pest infestations. The invention is intended to function as an alternative to the use of methyl bromide for the control of pest infestations. The invention provides an economically-sound and environmentally-appropriate alternative for food producers having pest control issues and those desiring to prevent such problems, and includes those producing foods such as dry-cured ham, aged artisan cheese, dry-cured pork, egg, fermented soy food products, foods for which fermentation processes are used and for which food product may be lost due to mold and/or pest infestation, and the like, and combinations of such foods, for example. Moreover, the coating compositions of the invention were shown to not adversely affect the taste or sensory qualities or characteristics of the foods.

1. INTRODUCTION

Many different types of dry-cured hams are currently produced around the world. Some of the most popular dry-cured hams are Iberian and Serrano ham from Spain, Corsican ham from France, country style ham from the United States, Westphalia ham from Germany, and Jing Hua ham from China. Aging, also known as ripening, is the processing step that develops the unique and characteristic aroma and flavor of dry-cured ham. Aging conditions are very different, based on the type of ham, and the length of the aging process varies from 3 months to 36 months (Toldrá, 2010).

The mold or cheese mite, *Tyrophagus putrescentiae*, is a ubiquitous cosmopolitan pest species having a high reproduction rate that infests stored food products such as grains, peanuts, cheese, cotton seed, and dry-cured ham. Female mites kept on wheat germ or yeast at 20° C. and 85% RH are able to lay up to 500 eggs during their life span. At 20° C. and 85% RH, depending on the type of food available, the mold mites complete one generation in 10 to 24 days (Boczek, 1991). Dry-cured ham aging temperatures usually range between 16° C. and 25° C. in Europe, and the relative humidity usually ranges between 65% and 80% (Toldrá, 2010). In the United States, the aging temperatures are higher, often greater than 28° C. (Rentfrow, Chaplin, & Suman, 2012). Dry-cured ham is very susceptible to mite infestations after 4-6 months of aging and the environmental conditions where hams are aged also favor mite growth and reproduction (Rentfrow, Hanson, Schilling, & Mikel, 2008). Mold mites have been reported as a problem for dry-cured ham both in Spain (Sánchez-Ramos & Castañera, 2000) and in the United States (Rentfrow et al., 2012).

Methyl bromide, a colorless, odorless, non-flammable gas, has been used to fumigate commodities and buildings worldwide since the 1930s (Fields & White. 2002) and is the only known fumigant that is effective at controlling ham mite infestations as of 2013 (EPA, 2013). In 1992, methyl bromide was listed as an ozone depleting substance under the Montreal Protocol, in which all developed countries agreed to reduce the amount of their application of methyl bromide by 2005 (TEAP, 2000). Since 2004, critical use exemptions have been granted in developed countries on a yearly basis if a technical and economically-feasible alternative with acceptable environmental and health effects was not available. A critical use exemption of 3,240 kg was approved for dry-cured pork products in the United States in 2015 (EPA, 2013). Exploring potential alternatives to control mite infestation is very important for the economic viability of the dry-cured ham industry in the U.S.

Potential alternatives for methyl bromide fumigation include fumigants such as phosphine, physical control methods such as modified atmosphere, pesticides and bioactive compounds such as Storcide II® and limonene from pine essential oils (Abbar, Zhao, Schilling, & Phillips, 2013; Macchioni et al., 2002; Sánchez-Molinero, Garcîa-Regueiro, & Arnau, 2010; and Sekhon et al., 2010). In addition to these alternatives, coating hams with vegetable oils or hot lard is a common practice in Spain to control mite infestations in dry-cured ham (Garcîa, 2004). Cured meat has been rubbed with paste of lard on the surface prior to storage to prevent flies and bacteria for over 100 years (Smith, 1923). It has also been reported that several legal food additives applied to the surfaces of small ham cubes would inhibit mite reproduction following forced inoculation with live mites (Abbar et al., 2013). These results on mite inhibition with food-safe additives facilitated the research that resulted in the present invention.

Edible coatings have been applied for different purposes on a variety of food products, including fresh fruits and vegetables, confections, and meat products. For meat products, edible films and protective coatings have been used to prevent off-flavor due to oxidation, discoloration, quality loss such as shrinkage, and microbial contamination (Ustunol, 2009). For example, film coatings made from k-carrageenan incorporated with ovotransferrin (a protein of avian egg's antimicrobial defense system) and ethylenediaminetetraacetic acid (EDTA) have been applied on fresh chicken breasts and have shown inhibition against *E. coli* and total aerobic bacteria during storage (Seol, Lim, Jang, Jo, & Lee, 2009). To be qualified as a coating for dry-cured ham, the compound must: 1) be food-grade; 2) be able to attach to the ham surface; 3) be able to cover the ham surface evenly; 4) be stable during the aging process; 5) be permeable to water vapor and oxygen: 6) be able to suffocate, kill, and/or repel mites and insects when applied properly; 7) not adversely affect ham flavor; and 8) be easily removed after the aging process. The food-grade coatings of the present invention were very effective at controlling mite infestations under laboratory conditions, were permeable to moisture, and did not change the sensory properties of the food or dry-cured ham.

2. MATERIALS AND METHODS 2.1 Food-Grade Coating Materials on Ham Cubes
2.1.1 Materials All parameters including, but not limited to, temperature, pressure, time, sizes, amounts, and percentages, for example, presented herein represent approximate values. Lard (ConAgra Foods, Omaha, Nebr.), mineral oil (CVS® Pharmacy Inc., Woonsocket, R.I.), glycerin (Essential Depot, Sebring, Fla.), propylene glycol (PG) (Essential Depot, Sebring, Fla.), and potassium sorbate (Crosby & Baker Ltd., Westport, Mass.) were used as coating materials. About ten percent (10%) potassium sorbate solution was prepared in distilled water.
2.1.2 Ham Preparation Six (6) dry-cured hams were obtained from a commercial ham plant. From each ham, seven (7) slices approx. 1.3 cm thick and five (5) slices approx. 2.5 cm thick were obtained and prepared. The 2.5 cm slices were then cut into 2.5 cubic centimeter cubes for the mite infestation study. Ham slices/cubes were dipped directly into mineral oil, propylene glycol, 10% potassium sorbate solution, and glycerin for about 1 minute and allowed to drip on a mesh colander for about another minute. Lard was applied directly by rubbing a thin layer to cover the entire area of each ham slice/cube.

For sensory evaluation, five (5) slices approx. 1.3 cm thick from each ham were treated as described for the ham cubes with mineral oil, propylene glycol, potassium sorbate, glycerin and lard, respectively. Two additional slices from each ham were non-treated control slices. Slices were then vacuum-packaged and stored at about 4° C. for further sensory analysis. For mite bioassays, one cube from each ham was randomly selected to treat with mineral oil, propylene glycol, potassium sorbate, glycerin, and lard, respectively. Another cube of ham was also randomly selected and freeze-dried until the water activity ($a_w$, or the partial vapor pressure of water in a substance divided by the standard state partial vapor pressure of water) dropped to about 0.65 on the surface and to about 0.8 inside the cube(s). Treated cubes were packaged in zip-lock bags and shipped overnight to Kansas State University, Manhattan, Kans. for the mite infestation study.
2.1.3 Mite Infestation Study Twenty (20) adult *T. putrescentiae* with 10 or more females per group were transferred onto each cube from a laboratory colony and each cube was placed in a ventilated, mite-proof 130 ml glass canning jar for incubation at about 25±1° C. and about 70% RH. For the first mite infestation study with cubes dipped in pure or diluted solutions of test material, mites were incubated for 21 days to allow for reproduction. In subsequent testing, in which propylene glycol was formulated into coatings, the mites incubation time was 14 days. Resulting mite populations on ham cubes were counted at the end of the 3-week or 2-week incubation period using a dissecting stereo-microscope (Olympus Model SZX10, Olympus Surgical & Industrial America INC.). Only adult or immature mobile stages of mites were counted as representing the level of reproduction from the initial twenty (20) mites used at the beginning of the trial.
2.2 Development of Film Coatings with Polysaccharide and Propylene Glycol
2.2.1 Materials Initial laboratory coating tests indicated that propylene glycol was effective at controlling mite infestations, so further studies were carried out to develop film coatings that contained propylene glycol and polysaccharides. This was done to keep the propylene glycol on the ham so that it remained active at controlling mites during food aging. Preliminary tests on polysaccharides suggested that both 50% and 98% propylene glycol (by weight or by volume) was effective at controlling mites with 2% carrageenan (CG) (by weight). To develop a polysaccharide gel solution with up to 50% propylene glycol, the following materials were also tested: modified food starch (INSTANT PURE-COTE, Grain Processing Corporation, Muscatine, Iowa 52761), agar (Tic Pretested® Agar RS-100 Powder, TIC Gums, Belcamp, Md. 21017), carrageenan (MBF-120i, x, INC., Waldo, Me. 04915; MBF-9414, Ingredients Solutions INC., Waldo, Me. 04915; Ticagel® 795 Powder, TIC Gums, Belcamp, Md. 21017), propylene glycol alginate (Ticaalgin® PGA LV Powder, TIC Gums, Belcamp, Md. 21017) (PGA), methylcellulose (TICAGEL® HV Powder, TIC Gums, Belcamp, Md. 21017), sodium alginate (TICA-algin® 400 Powder, TIC Gums, Belcamp, Md. 21017) (SA), and xanthan gum (Pre-Hydrated® Ticaxan® Rapid-3 Powder, TIC Gums, Belcamp, Md. 21017) (XG).
2.2.2 Solution Preparation with Polysaccharides and Propylene Glycol To evaluate how different polysaccharides interacted with propylene glycol, multiple combinations were tested (Table 1). For cold water soluble polysaccharides, distilled water at room temperature was used. All solutions were made in glass beakers with a magnetic stir bar inside each beaker, and solutions were stirred on magnetic stir plates until homogeneous. For hot water soluble polysaccharides, boiled water was used and the solutions were stirred on magnetic stir plates with heating elements until homogeneous. Metal meat hooks were used to dip ham cubes (2.5×2.5×2.5 cm$^3$) into the gel solutions for about 10 seconds. Coated cubes were hung at about 24° C. and 50% RH to determine the film-forming abilities of the tested combinations.
2.2.3 Ham Preparation for Mite Bioassay Three (3) sets of dry-cured ham cubes (2.5×2.5×2.5 cm$^3$) were prepared for three (3) mite bioassays. For the first mite bioassay trial, ham cubes were coated with pure polysaccharides and no propylene glycol. Agar, propylene glycol alginate, carrageenan, and xanthan gum were tested to evaluate the effectiveness of pure polysaccharide coatings at controlling mites. For the second and third trial, propylene glycol (Essential Depot, Sebring, Fla.) was combined with polysaccharide solutions (Table 2). Xanthan gum was solubilized at room temperature, and other polysaccharides were solubilized in boiling water on hot stirring plates and were heated and stirred until homogenous. The viscosity of the gel solutions increased as the temperature cooled. To maintain a consistent thickness of coatings on the cube surfaces, the temperatures of the dipping solutions were controlled (Table 2). Three (3) commercially-aged hams were used during each trial. Two (2) cubes from each ham were dipped in each treatment for about 10 seconds, which led to 6 cubes (3 replications with 2 subsamples) per treatment in total.

2.3 Film Characterization 2.3.1 Film Preparation for Thickness and Water Permeability Measurements Propylene glycol alginate, carrageenan, and xanthan gum were used to form gel solutions with propylene glycol. The combinations were the same as those in the third trial (Table 3), with the exception of the pure xanthan gum solution since xanthan gum has very poor film-forming capacity at the applied percentage. Solutions were poured into 150×15 mm plastic petri dishes to form a thin layer of films. To estimate the amount of the gel solution coated on ham per surface area, ham cubes with about 2.5 cm length on each side were coated and the weight gain per square centimeter was calculated. Based on the results of weight gain per unit area of different treatments and also to maintain the consistency of the amount of polysaccharides on each treatment, the amount of gel solution poured on each petri dish was 25±0.1 g for all treatments. The films were dried out at 24±0.5° C. and 50%±2% RH until the weight of films remained constant.

2.3.2 Film Thickness

Film thickness was measured using a digital micrometer (Fowler®, Model: 54-815-001-2, Newton, Mass.) with 0.002 mm accuracy. Three (3) films were measured for each treatment and two (2) measurements were taken from each film.

2.3.3 Water Vapor Permeability

Water Vapor Permeability (WVP) was tested according to ASTM method E96-95 (1995) with some modifications (Ghanbarzadeh, Almasi, & Entezami, 2011). Gas-tight amber glass vials (40 ml, o.d. 28×98 mm height) with propylene screw caps and Teflon-faced silicone septa (o.d. 22 mm) were used to determine the WVP of the films. The films were cut into round discs that were the same size and shape as the septa. On each septum, a 14 mm outer diameter (o.d.) hole was cut through at the center. The test film was placed between the screw cap and the septum. The cap was tightly screwed to the vial so that the only water vapor exchange pathway between the inside and the outside of the vial was through the 14 mm o.d. film area. Three (3) grams of anhydrous $CaSO_4$ (Cat No: AC217525000, Fisher Scientific, USA) was added in each cup to maintain 0% RH inside the cup. Cups were then placed in a desiccator containing saturated $K_2SO_4$ solution so that the RH inside the desiccator was maintained at about 97% at 25° C. The cups were weighed every 2 hours for the first day and then every 12 hours thereafter. Changes of weight were recorded as a function of time. Slopes (weight vs. time) were calculated by linear regression. Water vapor transmission rate (WVTR) was calculated as slope (g/h) divided by the transfer area ($m^2$). Water vapor pressure (WVP) ($gPa^{-1}\ h^{-1}\ m^{-1}$) was calculated as $$WVP = \frac{WVTR \times T}{P(R1 - R2)}$$

where T is the film thickness (m), P is the saturation vapor pressure of water (Pa) at the test temperature, R1 is the RH inside the desiccator, and R2 is the RH inside the vial. Further, P(R1-R2) is the driving force and, under the RH settings of this experiment at 25° C., the driving force was 3074 Pa.

2.3.4 Oxygen Transmission Rate

Oxygen transmission rate (OTR) of films made from propylene glycol alginate+carrageenan with 0%, 10%, and 20% propylene glycol were measured using a Mocon OX-Tran®2/21 (Mocon OX-TRAN® Model 2/21, Minneapolis, Minn.), which complies with ASTM F-1927 and uses a coulometric sensor to detect OTR through films. Tests were conducted with 100% oxygen, under 760 mm Hg at 25° C. and 50% RH. A mixture of nitrogen (98%) and hydrogen (2%) was used as the carrier gas. The OTR was first measured on all film treatments using a Mocon OX-Tran® Model 1/50 (Mocon, Minneapolis, Minn.), but the coatings transmission properties did not remain constant enough throughout the testing to achieve appropriate, stable results. Based on this fact, a subset of samples was submitted to an outside source to determine if the films that would most likely be adapted to the industry were permeable to oxygen.

2.4 Sensory Evaluation

Ham slices treated with lard, mineral oil, glycerin, propylene glycol, and potassium sorbate were evaluated. Coatings on ham slices were washed with tap water at room temperature before cooking. Ham slices were wrapped in aluminum foil bags and oven-baked at 177° C. to an internal temperature of 71° C. Upon serving, ham slices were cut into 2.5 cm×2.5 cm square pieces and placed into 29.5 ml clear plastic containers that were coded with 3-digit random numbers. Samples were presented to trained panelists (6-8), each with greater than 30 hours of experience in tasting dry-cured ham in a randomized order. Water, apple juice, unsalted crackers, and expectorant cups were provided to panelists who were seated in separate booths during each panel. A negative control was applied to establish the baseline for the determination of difference. The scale for the difference from control test was: 1=no difference, 2=slight difference, 3=moderate difference, 4=large difference, 5=very large difference.

2.5 Statistical Analysis

A randomized complete block design with three (3) replications was used to determine if the trained panelists (n=6-8) could detect a difference between coated and non-coated ham slices (P<0.05). A completely randomized design with three (3) replications was used to determine the effect of different treatments on ham mite mortality. When significant differences (P<0.05) occurred among treatments, Tukey's Honestly Significant Difference Test (P<0.05) was used to separate treatment means.

3. RESULTS AND DISCUSSION 3.1 Mite Reproduction and Sensory Testing of Food-Grade Coating Materials of the Invention The mean numbers of live mites on ham cubes that were treated with different food-grade materials and incubated for 3 weeks are shown in Table 3. Six (6) cubes were freeze-dried to determine the effect of water activity on mite development. No differences existed (P>0.05) among the control, freeze dried, and glycerin treatments, as all produced high numbers of mites. This indicated that glycerin (P>0.05) does not inhibit mite reproduction. All treatments increased from 20 to greater than 200 mites after 3 weeks of incubation. Potassium sorbate and mineral oil treatments had fewer mites (P<0.05) than the control, but their mite populations had grown from 20 to 77 and 94, respectively, which indicated that potassium sorbate and mineral oils are ineffective at preventing or controlling mite infestation (Table 3). Lard and propylene glycol-dipped ham cubes had the lowest mites numbers (P<0.05) compared to either the control, freeze-dried, or glycerin treatments. Since lard and propylene glycol had an average of 2 mites on the ham pieces after 3 weeks of incubation, it was evident that these two treatments were effective at preventing mite infestation at the benchtop level. Lard could likely be used to control mites once the product has completed aging since it is not permeable to moisture. However, it could not be used until after aging is complete, which limits its usability in commercial settings during the aging process.

No differences (P>0.05) were detected in sensory characteristics between control ham slices and ham slices treated with food-grade ingredients (Table 3). Compared with coating a whole ham, coating ham slices exposed much more muscle area to the coating materials. If no difference was detected from coating ham slices, it was logical that the same coating materials would not affect the sensory profile when coating a whole ham. In addition, propylene glycol has been used as a humectant in soft-moist dog foods and has been reported to be effective at controlling mite infestations (Aldrich, 2014).

3.2 Initial Coating Tests with Polysaccharides and Propylene Glycol

Since propylene glycol is effective at controlling mites and is permeable to moisture and oxygen when used in B-lactoglobulin coatings (Sothornvit & Krochta, 2000), it was selected for use with different polysaccharides to develop a gel solution with desired viscosity to form a consistent film coating on the ham surface. The polysaccharides/propylene glycol combinations were tested as shown in Table 1. Since previous work showed that 50% propylene glycol mixed with water was effective at controlling mites (Abbar et al., 2013), the polysaccharides from Table 1 were tested with up to 50% propylene glycol (by weight or by volume). Adding 50% propylene glycol to the coating formulation affected the gel-forming abilities of some of the tested polysaccharides. Starch, carrageenan, and sodium alginate (with added $Ca^{2+}$) formed good gels with pure water; however, with 50% propylene glycol, they either did not gel or formed a very weak gel. On the contrary, propylene glycol alginate formed a weak gel with pure water, but had very good gel-forming capacity when combined with 50% propylene glycol. When propylene glycol alginate was combined with carrageenan (propylene glycol alginate+carrageenan, or PGA+CG), a very consistent film coating was formed on the ham surface with 50% propylene glycol. Xanthan gum formed a viscous and consistent gel both with and without propylene glycol. The gum component of the invention preferable acts as a carrier for the active ingredient(s), while water is used typically to swell the gum, so that the gum and water combination may act as a carrier. The gum can also be dissolved in the propylene glycol or active ingredient(s) first and may also act as a composition stabilizer.

Based on the results of the initial dipping tests shown in Table 1, selected polysaccharides were mixed with either about 0% or about 50% propylene glycol for initial mite mortality tests (first and second trials in Table 2). All polysaccharide coatings with 0% propylene glycol had fewer mites (P<0.05) than the control treatment, but there was no difference (P>0.05) in the number of mites produced among these three coating treatments (Table 4). However, all coatings with about 50% propylene glycol had absolutely no mites found alive after the 14-day incubation period (Table 4).

3.3 Coatings Developed with Polysaccharides and Propylene Glycol

The purpose of the research that led to the present invention was to find an effective and economical alternative to the use of methyl bromide and, as a result, the food-grade coatings and compositions of the invention were formulated as an effective alternative at minimal cost. Since xanthan gum and PGA+CG treatments numerically had the fewest mites in the previous experiment, these two treatments were selected for further testing to assess possible lower propylene glycol concentrations and reduced application costs. Xanthan gum (XG 1%) and propylene glycol alginate (PGA 1%)+carrageenan (CG 1%) were selected to conduct dipping tests for their capability to form thick and consistent gel solutions with 0-50% propylene glycol (Table 5). The units of measure for the composition mixture materials were as follows: by weight or by volume of propylene glycol, and by weight of xanthan gum, propylene glycol alginate, and carrageenan. Water was utilized in the composition mixtures of the invention in a sufficient amount, typically from about 50% up to about 90% by volume.

Similar to the results shown in Table 4, the two coating composition treatments with 0% propylene glycol were effective (P<0.05) at reducing mite reproduction when compared to the control. When 10% PG was added to the PGA+CG treatment, the mite population was almost at non-detectable levels with an average of 2 mites per jar (P<0.05). This indicated that propylene glycol could potentially be added at concentrations as low as 10% to control mites on aging dry-cured hams. All treatments with XG or PCA+CG with 20% PG or higher yielded no detectable mites after the incubation (Table 5). This indicated that XG was effective at controlling mites on ham cubes with concentrations of 20% PG and greater. These results suggested that tests can be scaled up with whole hams in simulated aging houses and in commercial dry-cured ham facilities using the coatings and compositions of the present invention.

3.4 Film Properties 3.4.1 Appearance

Figure 2:
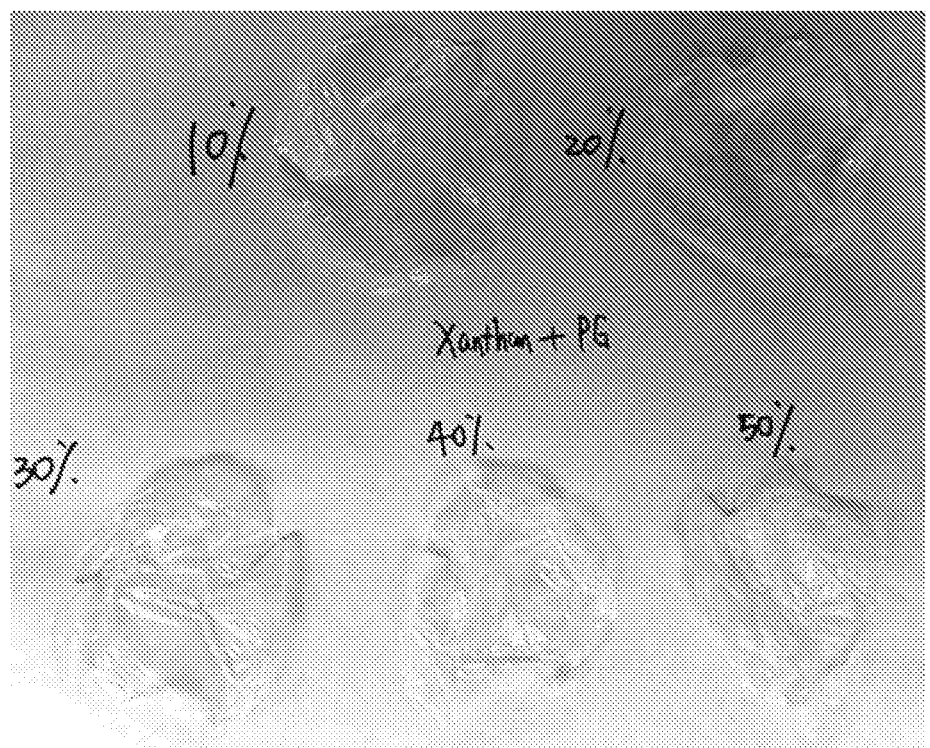
FIG. 2 depicts films of certain food-grade coating compositions of the present invention utilizing xanthan gum and propylene glycol as various percentages of the composition.
Figure 3:
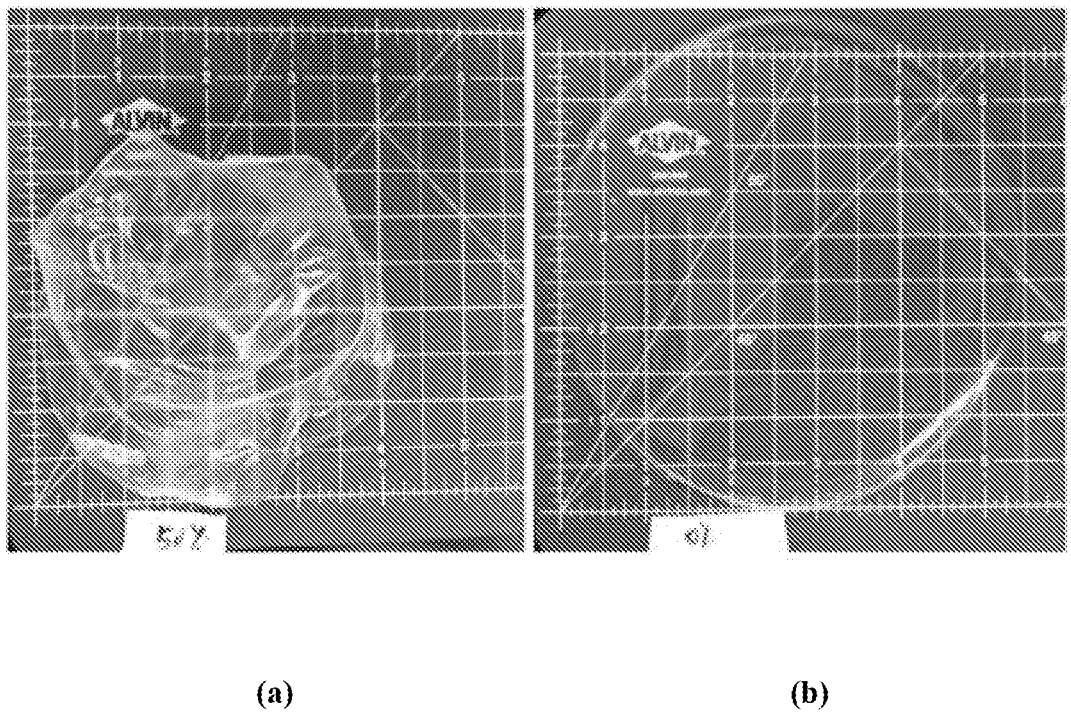
FIG. 3 depicts comparisons of films on scale board of food-grade coating compositions of the present invention utilizing: (a) carrageenan and propylene glycol alginate with propylene glycol as 50% of the composition, and (b) carrageenan and propylene glycol alginate with propylene glycol as 0% of the composition.
Figure 4:
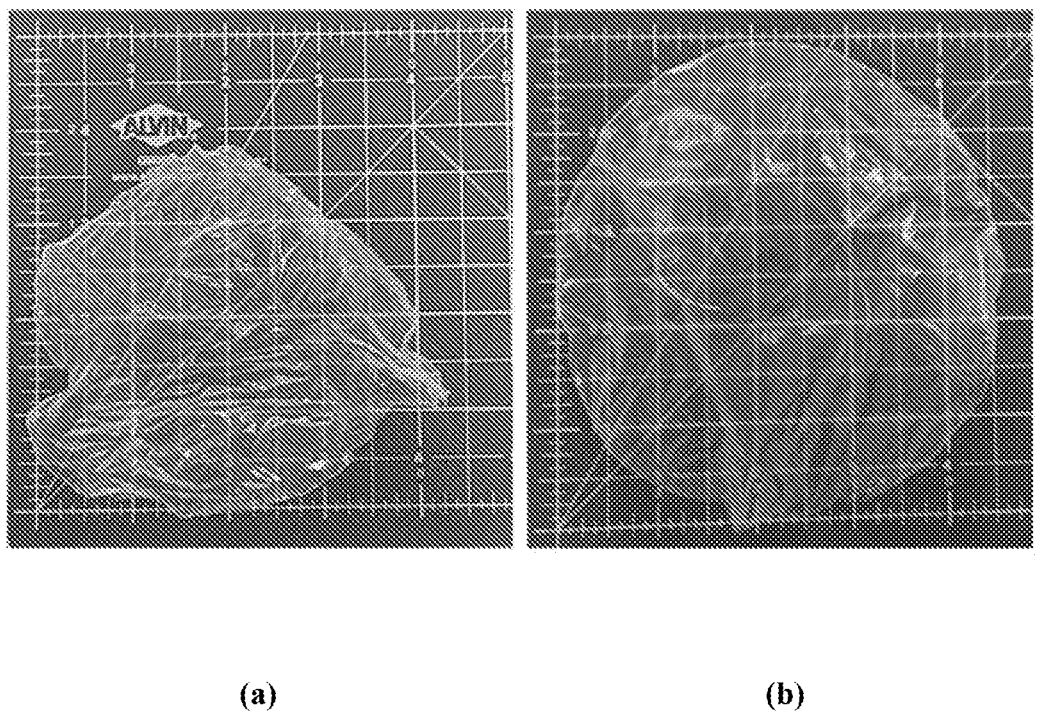
FIG. 4 depicts comparisons of films on scale board of food-grade coating compositions of the present invention utilizing: (a) xanthan gum with propylene glycol as 50% of the composition, and (b) xanthan gum with propylene glycol as 10% of the composition.
Figure 5:
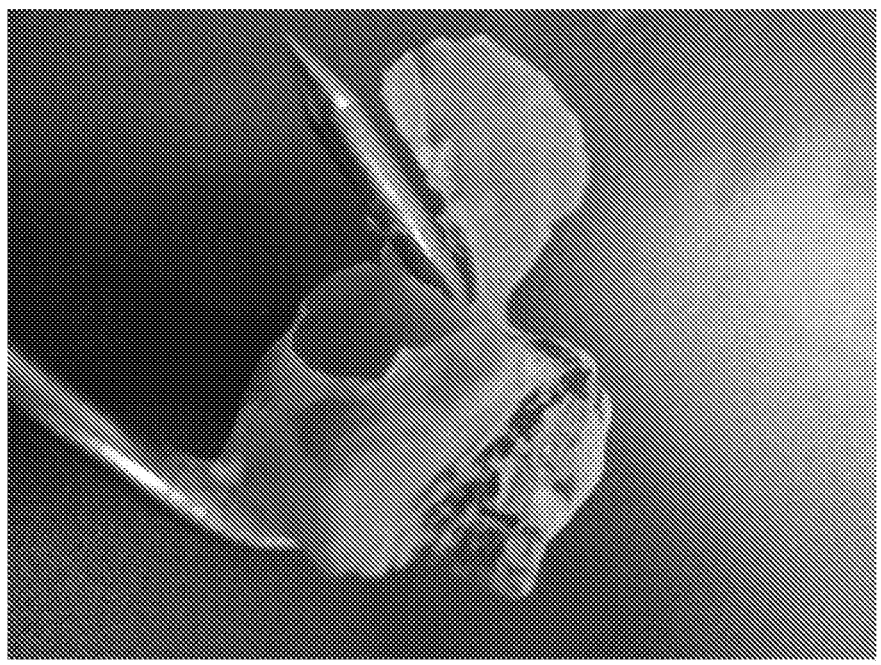
FIG. 5 is a photograph of a dry-cured ham cube dipped in a composition of food-grade coating of the present invention after three (3) weeks under 24° C. and 50% RH.

As a humectant, PG kept the films from drying out too fast with its two hydroxyl groups that attract and retain water molecules. The more PG added in the solution, the longer it took for the films to reach consistent weight at 25° C. and 50% RH. After drying out, films with PG wrinkled to some extent (FIGS. 1-4). FIG. 1 shows films made from 1% carrageenan+1% propylene glycol alginate with 0-50% propylene glycol (PG). FIG. 2 shows films made from 1% xanthan gum with 10-50% PG. FIG. 3 shows comparisons of films made from (a) 1% carrageenan+1% propylene glycol alginate with 50% PG and (b) 1% carrageenan+1% propylene glycol alginate with 0% PG. FIG. 4 shows comparisons of films made from (a) 1% xanthan gum with 50% PG on scale board and (b) 1% xanthan gum with 10% PG on scale board. Three possible explanations for film wrinkling are as follows: 1) different parts of the film dried at slightly different rates due to slight differences in PG distribution; 2) randomness of breaking/reforming of hydrogen bonds due to a slightly different surrounding environment; and/or 3) PG slightly affected the polymer rearrangement of polysaccharides during drying. As a processing aid, the food-grade coatings should be removed from the ham surface before packaging for distribution. The coatings of the present invention could be easily peeled off from the ham cubes as shown in FIG. 2, which shows a dry-cured ham cube dipped in a composition of food-grade coating of the present invention comprising 50% propylene glycol and 1% carrageenan+1% propylene glycol alginate after three (3) weeks at about 24° C. and 50% RH.

3.4.2 Thickness

The thickness of films made from xanthan gum and propylene glycol alginate+carrageenan increased and demonstrated a linear and quadratic trend (P<0.05) as the propylene glycol percentage increased (Table 6). The XG treatment with 20% and 30% PG, respectively, were thicker than XG with 10% PG, but were not different (P>0.05) from one another. The XG with 40% PG was thicker than the 10% and 20% PG treatments, but not different from the 30% PG treatment. The XG with 50% PG was thicker (P<0.05) that the 0%. 10%, 20%, and 30% PG treatments. Similar to the results for XG, the thickness of the PGA+CG films increased linearly (P<0.05) as the PG level increased. The PGA+CG+ 50% PG was thicker than all other treatments, the 40% PG treatment was thicker than the 0%, 10%, 20%, and 30% treatments, the 30% PG treatment was thicker than all percentages below it, and the 0% treatment was less thick than the 10% and 20% PG treatments. One reason for increased thickness could have been the decreased film areas due to shrinkage, since increasing levels of PG led to increases in shrinking during drying (FIGS. 1-4).

3.4.3 Coating Process

One typical example of the process of the invention in making the coating composition and in coating food is as follows:

To formulate about 10 liters of PGA+CA+20% PG, the materials used are 100 grams of PGA, 100 grams of CA, and 2 liters of PG (lard and/or other active ingredients may also be used). The PGA and CA are slowly dispersed into the 2 liters of PG. Water (or warm water) is added to the mixture of PG and PGA/CA and the mixture is stirred as the water is added. The mixture is heated to boil or at least to about 185° F. The mixture is cooled to about 130° F. for dipping, spraying, and/or coating the food. The same procedure applies for the composition mixtures when using or additionally using xanthan gum, except that no heating is needed.

3.4.4 Water Vapor Permeability

Water vapor permeability (WVP), i.e., moisture permeability, for both films made from xanthan gum and propylene glycol alginate+carrageenan increased with increasing percentage of propylene glycol (Table 6). There was a linear and quadratic increase (P<0.05) in WVP for xanthan gum as the propylene glycol concentration increased. Though not compared statistically, the WVP was greater in PGA+CG when compared to the XG. In addition, there was a linear, quadratic, and cubic increase in WVP as propylene glycol percentage increased from 0% to 50%. All films were highly permeable to water, which allowed moisture loss needed so that the dry-cured ham can be preserved during aging and meet the 18% moisture loss requirement by the U.S. Department of Agriculture (USDA, 1999). Propylene glycol is at least one of the functional and active ingredients in the compositions and film coatings of the present invention for controlling pests such as mites. However, the propylene glycol could also be added as a plasticizer that has a similar function as glycerol and sorbitol to reduce the brittleness of films. When used as a plasticizer, the amount of propylene glycol added to the solution is usually between 10% to 60% by weight of the polysaccharide (Skurtys et al., 2010). Generally, the addition of plasticizers to polysaccharides films increases film permeability to gas and water vapor (Alves, Costa, & Coelhoso, 2010; Mali, Grossmann, García, Martino, & Zaritzky, 2004; Rao, Kanatt, Chawla, & Sharma, 2010; and Skurtys et al., 2010), similarly to what was observed in the research that led to the present invention.

American dry-cured ham products need to lose at least 18% of their original weight during the production process. Therefore, the WVP of film coatings must be considered when choosing a proper coating for dry-cured ham. A preliminary test of WVP was carried out by coating whole hams with different coatings and the weight loss of each ham was recorded for 48 days in simulated aging houses. The coating treatments were as follows: control, 100% propylene glycol, 2% Carrageenan+50% propylene glycol, hot lard dip, and diatomaceous earth. Six (6) hams were treated for each treatment. Compared with control hams which had an average of 7.4% weight loss after 48 days, hams treated with 2% carrageenan+50% propylene glycol lost 6.4% of weight. Hams coated with a thin layer of lard lost 5.3% of their original weight. Hams rubbed with a thin layer of diatomaceous earth lost 6.8% of their original weight.

3.4.5 Oxygen Transmission Rate

Oxygen transmission rate (OTR) of films of the present invention made from propylene glycol alginate+carrageenan with 0%, 10%, and 20%, respectively, of propylene glycol were measured in duplicate. The average reading of films made with 0%, 10%, and 20% propylene glycol was 1.922 ml/(m$^2$·day), 1.953 ml/(m$^2$·day), and 1.876 ml/(m$^2$·day), respectively. These coatings showed good barrier properties to oxygen and were similar in permeability to a lower mol (%) EVOH resin (Mokwena, Tang, Dunne, Yang, & Chow, 2009). Since the OTR of the films was relatively low, additional studies could be conducted to increase oxygen permeability, such as with the use of b-lactoglobulin (Sothornvit & Krochta, 2000), which forms an oxygen permeable film when combined with propylene glycol.

4. EFFICACY

The integration of protective coatings, and specifically of the coatings of the invention, onto and/or into food containers, such as food nets, so that the coatings are integral to and a part of the containers and so that both coating and container can be applied to and eventually removed together from the food, is a novel feature of the methodology of the invention. The invention also provides for real-time control and monitoring of the composition mixture temperatures via thermometer(s)/gauge(s) and of the infusion speed, pressure(s), relative humidity, or a combination thereof, via control and monitoring gauge(s) during the integration process. The at least one treated food container can be used with food that has been treated with the composition mixtures of the invention and/or with food that has not been treated. Finally, the method of food protection includes sufficiently wrapping or covering the food with the treated food container(s).

One typical example of the process of the invention of infusing the coating compositions to or into food containers (ham nets) is described as follows:

Using about 10 liters of food-grade coating composition mixture (as described above in section 3.4.3, for example), the composition temperature should be maintained between about 130° F. and about 150° F. If the PG concentration is increased, the composition temperature should be increased slightly accordingly since PG solidifies faster as the concentration is increased. The compositions can be poured or fed into a netting machine, or similar device, (Wrigly netting machine customized by Midwest Metalcraft for production testing) whereby cotton or cotton/polyester blend netting or similar material is fed through a roller system with the mixtures. A roller system, or multiple roller system, can be used to remove extra or excess coating composition and to maintain the absorption of the composition as uniform as possible in all portions of the netting or container material. The temperature of the composition mixtures and the materials and the speed, pressure, relative humidity, or a preferred combination, of the infusion process of combining the composition mixture(s) and the container(s) (onto or into the container(s)) are controlled and monitored during the infusion process. The final container product can then be vacuum packaged for use on the food to be protected. The container(s) of the invention can be used with untreated food, any treated food, or food treated with the food-grade coating composition mixtures of the invention. The container(s) of the invention further can be used for storing, processing, aging, curing, or a combination thereof, of the food and can be a bag, wrap, mesh, net, or any combination, for example, that provides contact with the food.

The compositions of the invention and methodologies described herein provide increased shelf life and efficacy of protection from pests, typically from about two weeks to about 4 weeks and to about 8 weeks. Tables 7 through 20 show mite growth/reproduction on tested treated ham cubes. Letter designations (letters a-d) with data in these Tables, as well as those designations with data in Tables 3 through 6 (letters a-e), indicate data wherein the means with the same letter(s) are not significantly different ($p > 0.05$).

The invention provides pest protection efficacy and enhanced shelf life characteristics for food (ham) stored within food containers (nets) treated with various combinations of composition mixtures of the invention and subsequently protected for up to at least about eight (8) weeks. Tables 7 through 18 show two replications of mean mite population growth on ham cubes in ham nets (containers) treated with compositions of the invention. Tables 19 and 20 show excellent results of protection of food (ham cubes) against pests and pest reproduction using food containers (nets) treated with various combinations of composition mixtures of the invention.

The data shown in Tables 7 through 20 is based on the results of a study whereby ham nets were infused with food-grade gums and low, medium, and high concentrations of propylene glycol (PG). The gums that were used include xanthan gum (XG) and the combination of carrageenan (CA) and propylene glycol alginate (PGA). Ham cubes (2.5 cm$^3$) were wrapped with treated and untreated nets and placed in ventilated jars. Two sets of mite infestation studies were conducted. One experiment included XG+PG treated nets, and the other experiment consisted of CA+PGA+PG treated nets. For each set of experiments, three batches of samples were prepared and placed in a dark cabinet controlled at room temperature and a relative humidity of about 70-80%. For the mite inoculation experiments, twenty adult mites were introduced to ham cubes of each batch on the first day of storage, and at 4 weeks and 8 weeks storage, respectively. This was done to evaluate the long-term effectiveness of treated nets at controlling mite survival and reproduction. Two weeks after inoculation, the mites that were present on ham cubes, nets, and jars were counted under a microscope. This experiment was conducted twice, first with a relative humidity of about 70±5% for the first four weeks and increased to about 80±5% afterwards, and second with a relative humidity of about 80±5%.

Results indicated that the number of *T. putrescentiae* in the assays was less ($P < 0.05$) on ham cubes with applied gum and PG treated nets when compared to the number of mites on untreated or only gum treated hams over the 10-week storage period of the experiment. Mite inhibition was dependent on the PG concentration. The number of mites decreased as PG concentration increased, although there was no statistical difference ($P > 0.05$) among the low, medium, and high PG treatments. Medium and high concentrations of PG treatments showed the highest mortality rate and lowest reproductive rate of mites; on average, less than 6 mites were found on these treatments as compared to a few hundreds of mites on untreated ham cubes. In addition, the fungal growth increased as the relative humidity increased, and higher relative humidity facilitated mite growth and reproduction. However, use of medium or high concentrations of PG treated nets controlled mites at both the low (70% RH) and high (80% RH) relative humidity. The results indicated that incorporating PG into ham nets, as a natural food-grade fungicide, inhibited the growth and reproduction of *T. putrescentiae* and mold growth on dry-cured ham cubes. The containers (nets) infused with compositions of the invention provided effective protection of the food (ham) for up to at least about 8 weeks.

5. CONCLUSIONS

Coatings made from propylene glycol, xanthan gum, and carrageenan+propylene glycol alginate are effective at preventing ham mite infestations on treated ham pieces under laboratory conditions. In addition these novel coatings and compositions, which were applied in an effective amount to food such as ham, were permeable to moisture, which is essential to the food aging process. The coatings and compositions of the invention can be scaled up for both experimental (mite-inoculated foods and/or hams) and commercial treatment (natural conditions) of whole dry-cured foods and hams. Compositions can further be applied, in combination to separately being applied to foods, in an effective amount to and/or within food containers, such as ham nets and bags, to increase the effectiveness of pest control during the food processing and/or aging period(s). Infusion of compositions of the invention, for example, into or onto (within or combined with) food containers and control of the composition mixture temperature(s) and the infusion process speed, pressure, relative humidity, or a combination thereof, can provide effective pest and/or mold protection of foods.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

The compositions, processes, systems, and methods of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

TABLE 1

Combinations of different polysaccharides and propylene glycol (PG) at different ratios for coating tests (w/w).

| Polysaccharide and % | | With | PG | Water | Heat |
|---|---|---|---|---|---|
| PGA | 1% | n/a | 5% | 94% | No |
| PGA | 1% | n/a | 10% | 89% | No |
| PGA | 1% | n/a | 20% | 79% | No |
| PGA | 1% | n/a | 30% | 69% | No |
| PGA | 1% | n/a | 40% | 59% | No |
| PGA | 1% | n/a | 50% | 49% | No |
| PGA | 2% | n/a | 10% | 88% | No |
| PGA | 2% | n/a | 20% | 78% | No |
| PGA | 2% | n/a | 30% | 68% | No |
| PGA | 2% | n/a | 40% | 58% | No |
| PGA | 2% | n/a | 50% | 48% | No |
| PGA | 0.5% | 1% ST | 50% | 48.5% | Yes |
| PGA | 1% | 1% ST | 50% | 48% | Yes |
| PGA | 2% | 2% ST | 50% | 46% | Yes |
| PGA | 1% | 0.5% CG | 50% | 48.5% | Yes |
| PGA | 1% | 1% CG | 50% | 48% | Yes |
| ST | 1% | n/a | 50% | 49% | Yes |
| ST | 2% | n/a | 50% | 48% | Yes |
| ST | 4% | n/a | 50% | 46% | Yes |
| CG | 1% | n/a | 10% | 89% | Yes |
| CG | 1% | n/a | 30% | 69% | Yes |
| CG | 2% | n/a | 15% | 83% | Yes |
| CG | 2% | n/a | 30% | 68% | Yes |
| CG | 2% | n/a | 50% | 48% | Yes |
| CG | 3% | n/a | 30% | 67% | Yes |
| CG | 3% | n/a | 50% | 47% | Yes |
| MC | 1% | n/a | 50% | 49% | Yes |
| MC | 2% | n/a | 50% | 48% | Yes |
| MC | 3% | n/a | 50% | 47% | Yes |
| XG | 1% | n/a | 10% | 89% | No |
| XG | 1% | n/a | 30% | 69% | No |
| XG | 1% | n/a | 50% | 49% | No |
| XG | 2% | n/a | 50% | 48% | No |
| SA | 1% | n/a | 50% | 49% | No |
| SA | 2% | n/a | 50% | 48% | No |
| Agar | 1% | n/a | 50% | 49% | Yes |
| Agar | 2% | n/a | 50% | 48% | Yes |

[1]PGA: propylene glycol alginate, ST: starch, CG: carrageenan, MC: methyl cellulose, XG: xanthan gum, SA: sodium alginate.

TABLE 2

Polysaccharides and propylene glycol (PG) treatment combinations (w/w) and dipping temperatures for dry-cured ham cubes.

| | First Trial | | |
|---|---|---|---|
| Polysaccharides | PG | Water | Dipping Temp |
| XG 1% | n/a | 99% | Rm Temp |
| Agar 2% | n/a | 98% | 40° C. |
| PGA 2% | n/a | 98% | 60° C. |
| PGA 1% + CG 1% | n/a | 98% | 60° C. |
| Control | n/a | 100% | Rm Temp |

| | Second Trial | | |
|---|---|---|---|
| Polysaccharides | PG | Water | Dipping Temp |
| XG 1% | 50% | 49% | Rm Temp |
| Agar 2% | 50% | 48% | 30° C. |
| PGA 2% | 50% | 48% | 60° C. |
| PGA 1% + CG 1% | 50% | 48% | 60° C. |
| Control | n/a | 100% | Rm Temp |

TABLE 2-continued

Polysaccharides and propylene glycol (PG) treatment combinations (w/w) and dipping temperatures for dry-cured ham cubes.

| | Third Trial | | |
|---|---|---|---|
| Polysaccharides | PG | Water | Dipping Temp |
| XG 1% | n/a | 99% | Rm Temp |
| XG 1% | 10% | 89% | Rm Temp |
| XG 1% | 20% | 79% | Rm Temp |
| XG 1% | 30% | 69% | Rm Temp |
| XG 1% | 50% | 49% | Rm Temp |
| PGA 1% + CG 1% | n/a | 98% | 28° C. |
| PGA 1% + CG 1% | 10% | 88% | 30° C. |
| PGA 1% + CG 1% | 20% | 78% | 35° C. |
| PGA 1% + CG 1% | 30% | 68% | 40° C. |
| PGA 1% + CG 1% | 50% | 48% | 60° C. |

[1]PGA: propylene glycol alginate, CG: carrageenan, XG: xanthan gum.

TABLE 3

Mean number of mites on inoculated ham cubes (20 female mites/cube) after 3 weeks incubation and difference from control sensory test result of 1.3 cm ham slices treated with different food grade coatings after 8 weeks.

| | Mite | | Sensory | |
|---|---|---|---|---|
| Treatment | Mean | SEM | Mean | SEM |
| Control | 336$^a$ | 53.3 | n.a. | n.a. |
| Freeze dried | 236$^{ab}$ | 37.9 | n.a. | n.a. |
| 100% Glycerin | 219$^{abc}$ | 48.2 | 2.0$^a$ | 0.13 |
| 100% Mineral Oil | 94$^{bcd}$ | 29.4 | 2.1$^a$ | 0.14 |
| 10% Potassium Sorbate | 77$^{cd}$ | 35.8 | 1.8$^a$ | 0.13 |
| Lard | 2$^d$ | 1.8 | 1.6$^a$ | 0.15 |
| 100% Propylene Glycol | 2$^d$ | 0.7 | 2.1$^a$ | 0.12 |
| Negative Control | n.a. | n.a. | 2.0$^a$ | 0.13 |

[1] Means with same letter within each row are not significantly different ($p > 0.05$) using Tukey's Honestly Significant different test.
[2] Scale for sensory evaluation: 1-no difference, 2-slight difference, 3-moderate difference, 4-large difference, 5-very large difference.

TABLE 4

Mean number of mites on inoculated ham cubes (20 female mites/cube) coated with different polysaccharides and propylene glycol (PG) combinations after 2 weeks incubation.

| Polysaccharides | PG | Mean | SEM |
|---|---|---|---|
| Control | 0% | 274$^a$ | 52.62 |
| Agar (2%) | 0% | 111$^b$ | 18.82 |
| PGA (2%) | 0% | 55$^{bc}$ | 7.91 |
| XG (1%) | 0% | 29$^{bc}$ | 4.19 |
| PGA (1%) + CG (1%) | 0% | 28$^{bc}$ | 5.47 |
| Agar (2%) | 50% | 0$^c$ | 0 |
| PGA (2%) | 50% | 0$^c$ | 0 |
| XG (1%) | 50% | 0$^c$ | 0 |
| PGA (1%) + CG (1%) | 50% | 0$^c$ | 0 |

[1]PGA: propylene glycol alginate, CG: carrageenan, XG: xanthan gum
[2]Means with same letter within each row are not significantly different ($p > 0.05$) using Tukey's Honestly Significant different test.

TABLE 5

Mean number of mites on ham cubes coated with polysaccharides and different percentage of propylene glycol (PG) after 2 weeks incubation.

| | | Mite | |
|---|---|---|---|
| Polysaccharides | PG | Mean | SEM |
| Control | 0% | 476$^a$ | 48.72 |
| Negative control | 0% | n.a. | n.a. |

TABLE 5-continued

Mean number of mites on ham cubes coated with polysaccharides and different percentage of propylene glycol (PG) after 2 weeks incubation.

| Polysaccharides | PG | Mite Mean | SEM |
|---|---|---|---|
| PGA (1%) + CG (1%) | 0% | 186$^b$ | 45.22 |
| XG (1%) | 0% | 155$^b$ | 54.05 |
| XG (1%) | 10% | 70$^{bc}$ | 48.24 |
| PGA (1%) + CG (1%) | 10% | 2$^c$ | 0.48 |
| XG (1%) | 20% | 0$^c$ | 0 |
| PGA (1%) + CG (1%) | 20% | 0$^c$ | 0 |
| XG (1%) | 30% | 0$^c$ | 0 |
| PGA (1%) + CG (1%) | 30% | 0$^c$ | 0 |
| XG (1%) | 50% | 0$^c$ | 0 |
| PGA (1%) + CG (1%) | 50% | 0$^c$ | 0 |

[1]PGA: propylene glycol alginate, CG: carrageenan, XG: xanthan gum
[2]Means with same letter within each row are not significantly different (p > 0.05) using Tukey's Honestly Significant different test.

TABLE 6

Thickness and water vapor permeability (WVP) of films made from 1% xanthan gum (XG), 1% propylene glycol alginate (PGA) + 1% carrageenan (CG), and different percentages of propylene glycol (PG).

| | 1% XG | | | | PGA 1% + CG 1% | | | |
|---|---|---|---|---|---|---|---|---|
| | Thickness (mm) | | WVP (10$^{-7}$ gPa$^{-1}$ h$^{-1}$ m$^{-1}$) | | Thickness (mm) | | WVP (10$^{-7}$ gPa$^{-1}$ h$^{-1}$ m$^{-1}$) | |
| PG | mean | sem | mean | sem | mean | Sem | mean | sem |
| 0% | n.a | n.a. | n.a. | n.a. | 0.026$^e$ | 0.00040 | 2.07$^e$ | 0.010 |
| 10% | 0.013$^d$ | 0.00040 | 1.14$^e$ | 0.017 | 0.028$^d$ | 0.00022 | 2.25$^{de}$ | 0.021 |
| 20% | 0.016$^c$ | 0.00037 | 1.40$^d$ | 0.001 | 0.03$^d$ | 0.00058 | 2.42$^{cd}$ | 0.010 |
| 30% | 0.018$^{bc}$ | 0.00043 | 1.57$^c$ | 0.036 | 0.032$^c$ | 0.00070 | 2.60$^c$ | 0.105 |
| 40% | 0.019$^{ab}$ | 0.00050 | 1.68$^b$ | 0.019 | 0.036$^b$ | 0.00079 | 2.96$^b$ | 0.055 |
| 50% | 0.02$^a$ | 0.00060 | 1.77$^a$ | 0.039 | 0.045$^a$ | 0.00076 | 3.47$^a$ | 0.107 |

[1]Means with same letter within each row are not significantly different (p > 0.05) using Tukey's Honestly Significant different test.

TABLE 7

Mean of population growth of *Tyrophagus putrescentiae* fed on small dry-cured ham cubes treated with xanthan gum and propylene glycol infused nets after 2 weeks (n = 5). First rep:

| Treatment | Population growth mean (SE) | F, df, P-value |
|---|---|---|
| Control-without net-untreated | 516.6 (245) a | 20.49, 5, <0.0001 |
| Control-with net-untreated | 295.4 (53.8) b | |
| XG | 567.4 (195.8) a | |
| XG + 30% PG | 21.2 (12.4) c | |
| XG + 40% PG | 3 (1.9) c | |
| XG + 50% PG | 1.6 (3.6) c | |

TABLE 8

Mean of population growth of *Tyrophagus putrescentiae* fed on small dry-cured ham cubes treated with carrageenan, propylene glycol alginate, and propylene glycol infused nets after 2 weeks (n = 5). First rep:

| Treatment | Population growth mean (SE) | F, df, P-value |
|---|---|---|
| Control-without net-untreated | 784.4 (282.5) a | 19.23, 5, <0.0001 |
| Control-with net-untreated | 405 (309.7) b | |
| CG + PGA | 643.2 (132.6) a | |
| CG + PGA + 30% PG | 20 (18) c | |
| CG + PGA + 40% PG | 5.4 (4.4) c | |
| CG + PGA + 50% PG | 1.4 (1.1) c | |

TABLE 9

Mean of population growth of *Tyrophagus putrescentiae* fed on 4 weeks of small dry-cured ham cubes treated with xanthan gum and propylene glycol infused nets after 2 weeks (n = 5). First rep:

| Treatment | Population growth mean (SE) | F, df, P-value |
|---|---|---|
| Control-without net-untreated | 72.2 (46.7) a | 5.78, 5, 0.0012 |
| Control-with net-untreated | 44.6 (42.8) a | |
| XG | 37.2 (22.3) ab | |
| XG + 30% PG | 3.4 (1.5) bc | |
| XG + 40% PG | 1.8 (1.8) bc | |
| XG + 50% PG | 0.4 (0.5) c | |

TABLE 10

Mean of population growth of *Tyrophagus putrescentiae* fed on 4 weeks of small dry- cured ham cubes treated with carrageenan, propylene glycol alginate, and propylene glycol infused nets after 2 weeks (n = 5). First rep:

| Treatment | Population growth mean (SE) | F, df, P-value |
|---|---|---|
| Control-without net-untreated | 90.8 (75.3) a | 5.53, 5, 0.0016 |

TABLE 10-continued

Mean of population growth of *Tyrophagus putrescentiae* fed on 4 weeks of small dry- cured ham cubes treated with carrageenan, propylene glycol alginate, and propylene glycol infused nets after 2 weeks (n = 5). First rep:

| Treatment | Population growth mean (SE) | F, df, P-value |
| --- | --- | --- |
| Control-with net-untreated | 39.0 (33.2) b | |
| CG + PGA | 37.0 (14.6) b | |
| CG + PGA + 30% PG | 0.8 (1.8) b | |
| CG + PGA + 40% PG | 0.2 (0.4) b | |
| CG + PGA + 50% PG | 0 b | |

TABLE 11

Mean of population growth of *Tyrophagus putrescentiae* fed on 8 weeks of small dry- cured ham cubes treated with xanthan gum and propylene glycol infused nets after 2 weeks (n = 5). First rep:

| Treatment | Population growth mean (SE) | F, df, P-value |
| --- | --- | --- |
| Control-without net-untreated | 249.8 (46.7) a | 37.75, 5, <0.0001 |
| Control-with net-untreated | 248.8 (95) a | |
| XG-FPGA | 74.4 (21.4) b | |
| XG + PGA + 30% PG | 5.0 (3.6) c | |
| XG + PGA + 40% PG | 2.0 (1.4) c | |
| XG + PGA + 50% PG | 1.8 (2.7) c | |

TABLE 12

Mean of population growth of *Tyrophagus putrescentiae* fed on 8 weeks of small dry- cured ham cubes treated with carrageenan, propylene glycol alginate, and propylene glycol infused nets after 2 weeks (n = 5). First rep:

| Treatment | Population growth mean (SE) | F, df, P-value |
| --- | --- | --- |
| Control-without net-untreated | 264.2 (80.3) a | 16.23, 5, <0.0001 |
| Control-with net-untreated | 155.8 (82.8) b | |
| CG + PGA | 243.6 (125.3) ab | |
| CG + PGA + 30% PG | 3.0 (3.2) c | |
| CG + PGA + 40% PG | 2.8 (1.3) c | |
| CG + PGA + 50% PG | 1.2 (1.1) c | |

TABLE 13

Mean of population growth of *Tyrophagus putrescentiae* fed on small dry-cured ham cubes treated with xanthan gum and propylene glycol infused nets after 2 weeks (n = 5). Second rep:

| Treatment | Population growth mean (SE) | F, df, P-value |
| --- | --- | --- |
| Control-without net-untreated | 449.2 (110.4) a | 44.34, 5, <0.0001 |
| Control-with net-untreated | 266.8 (87.9) b | |
| XG | 197.6 (49.4) b | |
| XG + 30% PG | 18.0 (10.5) c | |
| XG + 40% PG | 2.8 (2.8) c | |
| XG + 50% PG | 2.0 (2.3) c | |

TABLE 14

Mean of population growth of *Tyrophagus putrescentiae* fed on small dry-cured ham cubes treated with carrageenan, propylene glycol alginate, and propylene glycol infused nets after 2 weeks (n = 5). Second rep:

| Treatment | Population growth mean (SE) | F, df, P-value |
| --- | --- | --- |
| Control-without net-untreated | 556.2 (169.4) a | 42.03, 5, <0.0001 |
| Control-with net-untreated | 169.4 (53.8) c | |
| CG + PGA | 382.2 (91.2) b | |
| CG + PGA + 30% PG | 0.6 (0.9) d | |
| CG + PGA + 40% PG | 0 d | |
| CG + PGA + 50% PG | 0 d | |

TABLE 15

Mean of population growth of *Tyrophagus putrescentiae* fed on 4 weeks of small dry-cured ham cubes treated with xanthan gum and propylene glycol infused nets after 2 weeks (n = 5). Second rep:

| Treatment | Population growth mean (SE) | F, df, P-value |
| --- | --- | --- |
| Control-without net-untreated | 388.2 (72.7) a | 65.58, 5, <0.0001 |
| Control-with net-untreated | 276.4 (76.6) b | |
| XG | 296.4 (54.1) b | |
| XG + 30% PG | 13.6 (10.4) c | |
| XG + 40% PG | 3.0 (1.9) c | |
| XG + 50% PG | 2.0 (1.9) c | |

TABLE 16

Mean of population growth of *Tyrophagus putrescentiae* fed on 4 weeks of small dry-cured ham cubes treated with carrageenan, propylene glycol alginate, and propylene glycol infused nets after 2 weeks (n = 5). Second rep:

| Treatment | Population growth mean (SE) | F, df, P-value |
| --- | --- | --- |
| Control-without net-untreated | 300.2 (85.0) a | 52.36, 5, <0.0001 |
| Control-with net-untreated | 114.4 (31.3) c | |
| CG + PGA | 221.6 (36.9) b | |
| CG + PGA + 30% PG | 3.4 (2.5) d | |
| CG + PGA + 40% PG | 2.0 (0.7) d | |
| CG + PGA + 50% PG | 1.0 (0.7) d | |

TABLE 17

Mean of population growth of *Tyrophagus putrescentiae* fed on 8 weeks of small dry- cured ham cubes treated with xanthan gum and propylene glycol infused nets after 2 weeks (n = 5). Second rep:

| Treatment | Population growth mean (SE) | F, df, P-value |
| --- | --- | --- |
| Control-without net-untreated | 173.6 (51.6) a | 35.20, 5, <0.0001 |
| Control-with net-untreated | 126.6 (38.9) b | |
| XG | 116.4 (28.4) b | |
| XG + 30% PG | 8.2 (5.6) c | |
| XG + 40% PG | 1.6 (1.5) c | |
| XG + 50% PG | 0.6 (0.5) c | |

TABLE 18

Mean of population growth of Tyrophagus putrescentiae fed on 8 weeks of small dry-cured ham cubes treated with carrageenan, propylene glycol alginate, and propylene glycol infused nets after 2 weeks (n = 5). Second rep:

| Treatment | Population growth mean (SE) | F, df, P-value |
|---|---|---|
| Control-without net-untreated | 176.0 (28.5) a | 36.91, 5, <0.0001 |
| Control-with net-untreated | 129.6 (43.9) b | |
| CG + PGA | 133.2 (50.7) b | |
| CG + PGA + 30% PG | 3.4 (1.8) c | |
| CG + PGA + 40% PG | 1.2 (1.3) c | |
| CG + PGA + 50% PG | 0.2 (0.9) c | |

TABLE 19

Mean numbers T. putrescentiae orienting to small dry-cured ham cubes covered with control and treated nets in a laboratory two-choice behavior bioassay

| Treatment | Treated | Control | Difference |
|---|---|---|---|
| XG + 30% PG | 0.4 (0.9) | 11.0 (2.5) | ** |
| XG + 40% PG | 0.2 (0.4) | 9.0 (2.1) | ** |
| XG + 50% PG | 0 | 9.8 (2.3) | ** |
| CG + PGA + 30% PG | 0.6 (0.9) | 11.8 (3.1) | ** |
| CG + PGA + 40% PG | 0.2 (0.4) | 10.0 (2.1) | ** |
| CG + PGA + 50% PG | 0 | 8.0 (2.6) | ** |

Pairwise comparison of treated and control orientation data followed by a two-sample Student's t-test, assuming unequal variances: * = $P < 0.05$, ** = $P < 0.01$.

TABLE 20

Mean number of eggs laid by T. putrescentiae on small dry-cured ham cubes covered with control and treated nets in a laboratory two-choice behavior bioassay

| Treatment | Treated | Control | Difference |
|---|---|---|---|
| XG + 30% PG | 0 | 129.0 (36.1) | ** |
| XG + 40% PG | 0 | 225.0 (82.9) | ** |
| XG + 50% PG | 0 | 162.0 (61.9) | ** |
| CG + PGA + 30% PG | 0 | 150.0 (63.7) | ** |
| CG + PGA + 40% PG | 0 | 114.0 (56.1) | * |
| CG + PGA + 50% PG | 0 | 154.0 (71.4) | ** |

Pairwise comparison of treated and control orientation data followed by a two-sample Student's t-test, assuming unequal variances:
* = $P < 0.05$,
** = $P < 0.01$.

REFERENCES

Abbar, S., Zhao, Y., Schilling, M. W., & Phillips, T. W. (2013). Chemical alternatives for suppressing the ham mite Tyrophagus putrescentiae. Paper presented at the Annual International Research Conference on Methyl Bromide Alternatives and Emissions Reductions, MBAO conference. San Diego, Calif. 36.

Abbar, S., Amoah, B., Schilling, M. W., Phillips, T. W. (2015). Efficacy of selected food-safe compounds to prevent infestation of the ham mite, Tyrophagus putrescentiae (Shrank) (Acarina:Acaridae), on southern dry-cured hams. Pest Management Science. 72(8): 1604-12.

Aldrich, G. (2014). Propylene glycol: When, where, and how should it be used. Petfood Industry. Retrieved from http://www.petfoodindustry.com/articles/4304-propylene-glycol-when-where-and-how-should-it-be-used Alves, V. D., Costa. N., & Coelhoso, I. M. (2010). Barrier properties of biodegradable composite films based on kappa-carrageenan/pectin blends and mica flakes. Carbohydrate Polymers, 79(2), 269-276.

Boczek, J. (1991). Mite pests in stored food. Ecology and Management of Food-Industry Pest. Association of Official Analytical Chemists: Arlington, Va., 57-79.

Campbell, L. Y., Zhao, Y., Abbar, S., Amoah, B., Portillo, H., Zhang, X., Young, D. J., Phillips, T. W., Schilling. M. W. (2016). Ham mite research update. National Country Ham Association Annual Meeting, Knoxville, Tenn., April 28-30.

EPA. (2013). Methyl Bromide Critical Use Renomination for post harvest dry-cured pork products. United States: Retrieved from http://www.epa.gov/ozone/mbr/CUN2014/2014CUNPork %20.pdf.

Fields, P. G., & White, N. D. (2002). Alternatives to methyl bromide treatments for stored-product and quarantine insects. Annu Rev Entomol, 47, 331-359.

García, N. (2004). Efforts to control mites on Iberian ham by physical methods. Experimental & applied acarology, 32(1-2). 41-50.

Ghanbarzadeh, B., Almasi, H., & Entezami, A. A. (2011). Improving the barrier and mechanical properties of corn starch-based edible films: Effect of citric acid and carboxymethyl cellulose. Industrial Crops and Products, 33(1), 229-235.

Gulati R., Mathur S. (1995) Effect of Eucalyptus and Mentha leaves and Curcuma rhizomes on Tyrophagus putrescentiae (Schrank) (Acarina:Acaridae) in wheat. Experimental and Applied Acarology 19:511-518. DOI: 10.1007/BF00052919.

Macchioni, F., Cioni, P. L., Flamini, G., Morelli, I., Perrucci, S., Franceschi, A., & Ceccarini, L. (2002). Acaricidal activity of pine essential oils and their main components against Tyrophagus putrescentiae, a stored food mite. Journal of Agricultural and Food Chemistry, 50(16), 4586-4588.

Mali, S., Grossmann, M. V. E., García, M. A., Martino, M. N., & Zaritzky, N. E. (2004). Barrier, mechanical and optical properties of plasticized yarn starch films. Carbohydrate Polymers, 56(2), 129-135.

Mokwena, K. K., Tang, J., Dunne, C. P., Yang, T. C., & Chow, E. (2009). Oxygen transmission of multilayer EVOH films after microwave sterilization. Journal of Food Engineering, 92(3). 291-296.

Rao, M. S., Kanatt, S. R., Chawla, S. P., & Sharma, A. (2010). Chitosan and guar gum composite films: Preparation, physical, mechanical and antimicrobial properties. Carbohydrate Polymers, 82(4), 1243-1247.

Rentfrow, G. R., Chaplin, R., & Suman. S. P. (2012). Technology of dry-cured ham production: Science enhancing art. Animal Frontiers, 2(4), 26-31.

Rentfrow, G. R., Hanson. D. J., Schilling, M. W., & Mikel, W. B. (2008). The use of methyl bromide to control insects in country hams in the Southeastern United States. Extension Publication. University of Kentucky Extension/National Country Ham Association. Publication #ASC-171, 1-2.

Rodriguez J., Rodriguez L. (1987) Nutritional ecology of stored-product and house dust mites. Nutritional ecology of insects, mites, spiders and related invertebrates. Wiley, New York: 345-368.

Sánchez-Molinero, F., García-Regueiro, J. A., & Arnau, J. (2010). Processing of dry-cured ham in a reduced-oxygen atmosphere: Effects on physicochemical and microbiological parameters and mite growth. Meat Science, 84(3), 400-408.

Sánchez-Ramos, I., & Castañera, P. (2000). Acaricidal activity of natural monoterpenes on *Tyrophagus putrescentiae* (Schrank), a mite of stored food. *Journal of Stored Products Research*, 37(1), 93-101.

Sekhon, R. K., Schilling, M. W., Phillips, T. W., Aikins, M. J., Hasan, M. M., Corzo, A., & Mikel, W. B. (2010). Effects of phosphine and methyl bromide fumigation on the volatile flavor profile and sensory quality of dry cured ham. *Meat Science*, 86(2), 411-417.

Seol, K. H., Lim, D. G., Jang. A., Jo. C., & Lee, M. (2009). Antimicrobial effect of κ-carrageenan-based edible film containing ovotransferrin in fresh chicken breast stored at 5° C. *Meat Science*, 83(3), 479-483.

Skurtys, O., Acevedo, C., Pedreschi, F., Enrione, J., Osorio, F., & Aguilera, J. M. (2010). *Food hydrocolloid edible films and coatings*: Nova Science Publishers.

Smith, H. H (1923). Curing Meat on the Farm. *Colorado Agricultural College Extensive Service Bulletin* 211-A.

Sothornvit, R., & Krochta, J. M. (2000). Plasticizer effect on oxygen permeability of beta-lactoglobulin films. *J Agric Food Chem*, 48(12), 6298-6302.

TEAP. (2000). Montreal Protocol on substances that deplete the ozone layer: UNEP Technology and Economic Assessment Panel.

Toldrá, F. (2008). Introduction: A Historical Perspective *Dry-Cured Meat Products* (pp. 1-5): Food & Nutrition Press, Inc.

Toldrá, F. (2010). Dry Cured-Ham. In F. Toldrá (Ed.). *Handbook of meat processing* (pp. 351-362). Chichester, UK: John Wiley & Sons.

USDA. (1999). "Country ham", Country style Ham". "Dry Cured Ham", "Country Pork Shoulder", "Country Style Pork Shoulder", and "Dry Cured Pork Shoulder" (Meat and Poultry Inspection Regulations). Retrieved from http://www.gpo.gov/fdsys/pkg/CFR-2012-title9-vol2/pdf/CFR-2012-title9-vol2-sec319-106.pdf Ustunol, Z. (2009). Edible films and coatings for meat and poultry. In M. E. Embuscado & K. C. Huber (Eds), *Edible films and coatings for food applications* (pp. 245-268): Springer New York.

Zhao Y., Abbar. S., Phillips T. W., & Schilling M. W. (2015). Phosphine fumigation and residues in dry-cured ham in commercial applications. *Meat Science* 107, 57-63.

Zhao Y., Abbar, S., Phillips T. W., Williams, J. B., Smith, B. S., Schilling M. W. (2016). Developing food-grade coatings for dry-cured hams to protect against ham mite infestation. *Meat Science* 113, 73-79.

Zhao Y., Phillips T., Abbar S., Mikel W., Schilling M. (2012) Effects of various foodgrade coatings on mite mortality and sensory quality of dry cured ham, Annual International Research Conference on Methyl Bromide Alternatives and Emission Reduction, Orlando, Fla., November 6th-8th.

What is claimed is:

1. A food-grade coating composition for controlling pest infestation and pest reproduction on or in food, or both, wherein the composition comprises mixtures containing 7.5% to 60% by weight or by volume of propylene glycol as at least one active ingredient and at least one inert food-grade acceptable carrier for the at least one active ingredient, wherein the composition is formed via controlled temperatures and the food-grade coating composition thickness increases as the percentage of the at least one active ingredient of the food-grade coating composition increases, the water vapor permeability of the food-grade coating composition increases as the food-grade coating composition thickness increases and ranges from about $1.1 \times 10^{-7}$ gramsPa$^{-1}$h$^{-1}$m$^{-1}$ to about $3.4 \times 10^{-7}$ gramsPa$^{-1}$h$^{-1}$m$^{-1}$, and the food-grade coating composition controls pest infestation for at least about eight weeks, and wherein the carrier is 1% to 2% by weight of xanthan gum and 46% to 99% by volume of water or, alternatively, 1% to 3% by weight of carrageenan, 0.5% to 2% by weight of propylene glycol alginate, and 46% to 99% by volume of water, and the food-grade coating composition is transparent.

2. The composition of claim 1, wherein the mixtures contain propylene glycol as the at least one active ingredient and xanthan gum, propylene glycol alginate, carrageenan, water, or a combination thereof.

3. The composition of claim 1, wherein the mixtures contain propylene glycol as the at least one active ingredient and xanthan gum, propylene glycol alginate, carrageenan, and water, and wherein the propylene glycol alginate is combined with the carrageenan.

4. The composition of claim 3, wherein the at least one active ingredient is propylene glycol, lard, or a combination thereof, and the at least one carrier for the at least one active ingredient is xanthan gum, propylene glycol alginate, carrageenan, water, or a combination thereof.

5. The composition of claim 1, wherein the composition contains at least one polysaccharide.

6. The composition of claim 3, wherein the composition contains up to about 50% by weight or by volume of propylene glycol.

7. The composition of claim 3, wherein the composition contains up to about 50% by weight or by volume of propylene glycol, about 1% by weight of xanthan gum, about 1% by weight of propylene glycol alginate, about 1% by weight of carrageenan, and up to about 90% by volume of water.

8. The composition of claim 1, wherein the composition is permeable to moisture.

9. The composition of claim 1, wherein the food is ham, pork, cheese, egg, fermented soy food product, or a combination thereof, and the pests are mites.

10. The composition of claim 1, wherein the composition has the form of a gel, a freeze-dried powder, a film, or a combination thereof.

11. A method for controlling pest infestation and pest reproduction on or in food, or both, the method comprising:
applying a food-grade coating composition on or in the food, or both, for controlling food pests and pest infestations and reproduction on the food;
controlling the temperature of the composition as the composition is applied to the food; and
optionally infusing at least one food container for containing the food, with or without the composition applied on or in the food, for storing, processing, aging, curing, or a combination thereof, with a food-grade coating composition within or combined with the at least one food container and controlling the temperature of the composition and the speed, pressure, or both, of the infusion of the composition onto and/or into the at least one food container and sufficiently wrapping or covering the food with the at least one food container for controlling food pests and pest infestations and protecting the food therefrom for at least about eight weeks, wherein the food-grade coating composition comprises mixtures containing 7.5% to 60% by weight or by volume of propylene glycol as at least one active ingredient and at least one inert food-grade acceptable carrier for the at least one active ingredient, wherein the food-grade coating composition thickness increases as the percentage of the at least one active ingredient of the food-grade coating composition increases and the water vapor permeability of the food-grade coating composition increases as the food-grade coating composition thickness increases and ranges from about $1.1 \times 10^{-7}$ gramsPa$^{-1}$h$^{-1}$m$^{-1}$ to about $3.4 \times 10^{-7}$ gramsPa$^{-1}$h$^{-1}$m$^{-1}$, and wherein the carrier is 1% to 2% by weight of xanthan gum and 46% to 99% by volume of water or, alternatively, 1% to 3% by weight of carrageenan, 0.5% to 2% by weight of propylene glycol alginate, and 46% to 99% by volume of water, and the food-grade coating composition is transparent.

12. The method of claim 11, wherein the mixtures contain propylene glycol as the at least one active ingredient and xanthan gum, propylene glycol alginate, carrageenan, water, or a combination thereof.

13. The method of claim 11, wherein the mixtures contain propylene glycol as the at least one active ingredient and xanthan gum, propylene glycol alginate, carrageenan, and water, and wherein the propylene glycol alginate is combined with the carrageenan.

14. The method of claim 13, wherein the at least one active ingredient is propylene glycol, lard, or a combination thereof, and the at least one carrier for the at least one active ingredient is xanthan gum, propylene glycol alginate, carrageenan, water, or a combination thereof.

15. The method of claim 11, wherein the composition contains at least one polysaccharide.

16. The method of claim 13, wherein the composition contains up to about 50% by weight or by volume of propylene glycol.

17. The method of claim 13, wherein the composition contains up to about 50% by weight or by volume of propylene glycol, about 1% by weight of xanthan gum, about 1% by weight of propylene glycol alginate, about 1% by weight of carrageenan, and up to about 90% by volume of water.

18. The method of claim 11, wherein the composition is permeable to moisture.

19. The method of claim 11, wherein the food is ham, pork, cheese, egg, fermented soy food product, or a combination thereof, and the pests are mites.

20. The method of claim 11, wherein the composition has the form of a gel, a freeze-dried powder, a film, or a combination thereof.

21. The method of claim 11, wherein the at least one food container is a bag, wrap, mesh, net, or a combination thereof.

22. The method of claim 11, wherein the applying of the composition on or in the food, or both, in an effective amount is by spraying, misting, dipping, machine coating, manual coating, or a combination thereof.

23. A container for controlling pest infestation and pest reproduction on or in food, wherein the container has been treated or infused with the food-grade coating composition of claim 1, wherein the food is either treated or is not treated with an effective amount of the composition, and wherein the container is for storing, processing, aging, curing, or a combination thereof, of the food.

24. The container of claim 23, wherein the container is a bag, wrap, mesh, net, or a combination thereof, that provides contact with the food.

* * * * *